United States Patent [19]

Munson et al.

[11] Patent Number: 5,597,600
[45] Date of Patent: Jan. 28, 1997

[54] TREATMENT OF COOKING OILS AND FATS WITH MAGNESIUM SILICATE AND ALKALI MATERIALS

[75] Inventors: James R. Munson, Branchburg, N.J.; Bryan L. Bertram, Georgetown, Ind.; Joseph D. Caldwell, Louisville, Ky.

[73] Assignee: The Dallas Group of America, Inc., Liberty Corner, N.J.

[21] Appl. No.: 462,510

[22] Filed: Jun. 5, 1995

[51] Int. Cl.$^6$ .................................................. A23D 7/00
[52] U.S. Cl. ..................... 426/330.6; 426/423; 426/438
[58] Field of Search .................................. 426/438, 423, 426/330.6

[56] References Cited

U.S. PATENT DOCUMENTS

| | | | |
|---|---|---|---|
| 2,416,097 | 2/1947 | Joachim . | |
| 3,231,390 | 1/1966 | Hoover . | |
| 3,251,693 | 5/1966 | Brenner . | |
| 3,940,498 | 2/1976 | Butterworth et al. . | |
| 3,947,602 | 3/1976 | Clewell et al. | 426/530 |
| 3,954,819 | 5/1976 | Husch . | |
| 3,955,004 | 5/1976 | Strauss et al. | 426/254 |
| 4,112,129 | 9/1978 | Duensing et al. | 426/417 |
| 4,375,483 | 3/1983 | Shuford | 426/330.6 |
| 4,681,768 | 7/1987 | Mulflur et al. . | |
| 4,880,652 | 11/1989 | Regutti | 426/417 |
| 4,913,922 | 4/1990 | Hawkes et al. | 426/417 |
| 4,957,758 | 9/1990 | Drijftholt et al. | 426/330.6 |
| 5,006,356 | 4/1991 | Munson . | |
| 5,068,115 | 11/1991 | Liebermann | 426/77 |
| 5,354,570 | 10/1994 | Friedman | 426/417 |

FOREIGN PATENT DOCUMENTS

| | | | |
|---|---|---|---|
| 2127035 | 4/1984 | United Kingdom | 426/330.6 |
| WO93/17567 | 9/1993 | WIPO | 426/330.6 |

*Primary Examiner*—Carolyn Paden
*Attorney, Agent, or Firm*—Elliot M. Olstein; Raymond J. Lillie

[57] ABSTRACT

A process for treating cooking oil or fat which comprises contacting cooking oil or fat with magnesium silicate and at least one alkali material, such as, for example, calcium hydroxide. The magnesium silicate and at least one alkali material are present in amounts effective to reduce the content of free fatty acids in the oil or fat and permit reuse of the oil or fat for cooking. Such method provides for improved extension of the life of the cooking oil employed in restaurant-type and industrial frying operations.

15 Claims, 2 Drawing Sheets

TREATMENT OF COOKING OILS AND FATS WITH MAGNESIUM SILICATE AND ALKALI MATERIALS

BACKGROUND OF THE INVENTION

This invention relates to the treatment of cooking oils and fats. More particularly, this invention relates to the treatment of cooking oils and fats to reduce the free fatty acid content thereof by contacting the cooking oils or fats with magnesium silicate and alkali materials such as calcium hydroxide.

Cooking oils and fats are employed in general for the cooking or frying of foods such as chicken, fish, potatoes, potato chips, vegetables, and pies. Such frying may take place in a restaurant wherein food is prepared for immediate consumption, or in an industrial frying operation where food is prepared in mass quantities for packaging, shipping, and future consumption.

In a typical restaurant frying operation, large quantities of edible cooking oils or fats are heated in vats to temperatures of from about 315° F. to about 400° F. or more, and the food is immersed in the oil or fat for cooking. During repeated use of the cooking oil or fat, the high cooking temperatures, in combination with water from the food being fried, cause the formation of free fatty acids (or FFA). An increase in the FFA decreases the oil's smoke point and results in increasing smoke as the oil ages.

Industrial frying operations involve the frying of large amounts of food for delayed consumption. Often, this is a continuous operation with the food being carried through the hot oil via a conveyor.

Industrial fryers of meat and poultry must follow the guidelines of the FDA Food Safety and Inspection Service (FSIS) Meat and Poultry Inspection Manual. The following are excerpts from that manual:

Section 18.40 Frying (a) Meat

Length of time fats and oils may be used for deep fat frying varies with temperature, quality of new fat added daily, and fat treatment during use. Suitability of these fats for further use can be determined from degree of foaming during use or from color, odor, and flavor.

Fat or oil should be discarded when it foams over the vessel's side during cooking, or when its color becomes almost black as viewed through a colorless glass container.

Section 18.40 Frying (b) Poultry (5) Fat Acceptability

Used fat may be made satisfactory by filtering, adding fresh fat, and cleaning the equipment regularly.

Large amounts of sediment and free fatty acid content in excess of 2 percent are usual indications that frying fats are unwholesome and require reconditioning or replacement.

Most industrial fryers use the 2% free fatty acid (FFA) limit, or less if mandated by their customers, for poultry as their main specification for oil quality, regardless of the food being fried.

In addition to hydrolysis, which forms free fatty acids, there occurs oxidative degeneration of fats which results from contact of air with hot oil, thereby producing oxidized fatty acids (or OFA). Heating transforms the oxidized fatty acids into secondary and tertiary by-products which may cause off-flavors and off-odors in the oil and fried food.

Caramelization also occurs during the use of oil over a period of time, resulting in a very dark color of the oil which, combined with other by-products, produces dark and unappealing fried foods.

Because of the cost resulting from the replacing of the cooking oils and fats after the use thereof, the food industries have searched for effective and economical ways to slow degradation of fats and oils in order to extend their usable life.

U.S. Pat. No. 4,112,129, issued to Duensing, et al., discloses a composition comprised of diatomite, synthetic calcium silicate hydrate, and synthetic magnesium silicate hydrate may be employed for reclaiming used fats and oils.

U.S. Pat. No. 4,681,768, issued to Mulflur, et al., discloses a process for treating used cooking oil or fat by contacting used cooking oil or fat with a high surface area amorphous synthetic magnesium silicate having a surface area of at least 300 square meters per gram.

Most industrial fryers use Silasorb (Celite Corporation, Denver, Colo.) which is a synthetic calcium silicate, as their filter medium because it is very effective in lowering free fatty acid concentration. Silasorb lowers the free fatty acid (FFA) concentration of the oil by a combination of adsorption and neutralization. The use of Silasorb, however, often darkens the oil.

In addition, the product of the neutralization of a fatty acid with an alkaline metal is a fatty acid soap. The amount of soap formed is dependent on the amount of alkaline metal present, and the initial percentage of free fatty acids in the oil. When the soap level is high, the oil foams. The use of Silasorb in order to lower the free fatty acid concentration sometimes results in uncontrollable foaming.

SUMMARY OF THE INVENTION

It is therefore an object of the present invention to provide an improved procedure for removing free fatty acids from cooking oil or fat employed in restaurant frying operations or in industrial frying operations.

DESCRIPTION OF THE PREFERRED EMBODIMENTS

In accordance with an aspect of the present invention, there is provided a process for treating cooking oil or fat. The process comprises contacting cooking oil or fat with magnesium silicate and at least one alkali material selected from the group consisting of alkaline earth metal hydroxides; alkaline earth metal oxides; alkali metal carbonates; alkali metal bicarbonates; alkaline earth metal carbonates; and alkali metal silicates. The magnesium silicate and the at least one alkali material are present in amounts effective to reduce the content of free fatty acids in the cooking oil or fat, and extend the usable life of the oil or fat for cooking.

The magnesium silicate and the at least one alkali material are preferably employed in a composition or mixture; however, the materials may be separately added.

In a preferred embodiment, the ratio of magnesium silicate to alkali material used for treating the oil or fat is generally at least 1.8:1 preferably at least 9:1, and generally does not exceed 32:1, and in most cases does not exceed 19:1, all by weight. Thus, in a composition in a preferred embodiment, based on the two components, the magnesium silicate is present in the composition in an amount of from about 65 wt. % to about 97 wt. %, preferably from about 90 wt. % to about 95 wt. %.

In general, the magnesium silicate is a magnesium silicate which is acceptable as a filter aid in food processing applications. For example, the Food Chemical Codex, Third Edition, gives the following specifications for a synthetic magnesium silicate which is acceptable in food processing and industrial frying operations:

| Loss or Drying | 15% max |
|---|---|
| Loss on Ignition | 15% max (dry basis) |
| % MgO | 15% min. (ignited basis) |
| % $SiO_2$ | 67% min. (ignited basis) |
| Soluble salts | 3% max. |
| Mole ratio $MgO:SiO_2$ | 1:1.36 to 1:3.82 |

In one embodiment, the magnesium silicate is an amorphous synthetic magnesium silicate having a surface area of at least 300 square meters per gram, and preferably has a surface area from about 400 square meters per gram to about 700 square meters per gram, and more preferably has a surface area from about 400 square meters per gram to about 600 square meters per gram. In addition, such magnesium silicate is preferably employed as coarse particles, with at least 75%, and preferably at least 85% of the particles having a particle size which is greater than 400 mesh, and with no more than 15%, and preferably no more than 5%, all by weight, having a particle size greater than 40 mesh. In most cases, the average particle size of the magnesium silicate employed in accordance with the present invention is in the order of but not limited to 20–75 microns. It is to be understood, however, that the magnesium silicate may have a particle size different than the preferred size. For example, the magnesium silicate may be used as a finely divided powder, i.e., 50% or more passes through a 325 mesh screen.

In addition, the hydrated magnesium silicate which is employed in accordance with a preferred embodiment of the present invention generally has a bulk density in the order of from 15–35 lbs./cu.ft., a pH of 7–10.8 (5% water suspension) and a mole ratio of MgO to $SiO_2$ of 1:1.8 to 1:4.

The following is a specification and typical value for a magnesium silicate which is employed in accordance with a preferred embodiment of the present invention:

TABLE

| Parameter | Specification | Typical Value |
|---|---|---|
| Loss on Drying at 105° C. | 15% max. | 12% |
| Loss on Ignition at 900° C. | 15% max | 12% |
| Mole Ratio $MgO:SiO_2$ | 1:2.25 to 1:2.75 | 1:2.60 |
| pH of 5% Water Suspension | 8.5 ± 0.5 | 8.5 |
| Soluble Salts % by wt. | 3.0 max. | 1.0% |
| Sieve Analysis: | | |
| % on 40 mesh | 5% max. | 1% |
| thru 400 mesh | 15% max. | 10% |
| Surface Area (B.E.T.) | 300 $M^2$/g min. | 400 |
| Refractive Index | | Approx. 1.5 |

A representative example of such a synthetic magnesium silicate having a surface area of at least 300 square meters per gram is available as Magnesol® Polysorb 30/40, a product of the Dallas Group of America, Inc., Liberty Corner, N.J., and also is described in U.S. Pat. No. 4,681,768.

In another embodiment, the magnesium silicate is an amorphous, hydrous, precipitated synthetic magnesium silicate which has been treated to reduce the pH thereof to less than about 9.0. As used herein, the term "precipitated" means that the amorphous hydrated precipitated synthetic magnesium silicate is produced as a result of precipitation formed upon the contact of a magnesium salt and a source of silicate in an aqueous medium.

For purposes of the present invention, the pH of the magnesium silicate is the pH of the magnesium silicate as measured in a 5% slurry of the magnesium silicate in water. The pH of the treated magnesium silicate in a 5% slurry preferably is from about 8.2 to about 8.9, and more preferably from about 8.5 to about 8.8, and most preferably is about 8.5. Examples of such a treated amorphous hydrous precipitated synthetic magnesium silicate are available as Magnesol® XL and Magnesol® PC-80, products of the Dallas Group of America, Inc., Liberty Corner, N.J., and also are described in U.S. Pat. No. 5,006,356.

In yet another embodiment, the magnesium silicate is a magnesium silicate which has a surface area of from about 50 square meters per gram to about 150 square meters per gram. Preferably, such a magnesium silicate has a mole ratio of MgO to $SiO_2$ of from about 2:2.6 to about 1:3.4, and a pH (5% water suspension) of from about 9.5 to about 10.5. An example of such a magnesium silicate is available as Magnesol® HMR-LS, a product of the Dallas Group of America, Inc., Liberty Corner, N.J.

In another embodiment, the magnesium silicate may be in the form of talc.

It is to be understood, however, that the scope of the present invention is not to be limited to any specific type of magnesium silicate or method for the production thereof.

In one embodiment, the at least one alkali material is an alkaline earth metal hydroxide.

Preferably, the alkaline earth metal hydroxide is calcium hydroxide ($Ca(OH)_2$).

In another embodiment, the at least one alkali material is an alkaline earth metal oxide. Alkaline earth metal hydroxides which may be employed include, but are not limited to, magnesium oxide (MgO) and calcium oxide (CaO).

In another embodiment, the at least one alkali material is an alkali metal carbonate. Alkali metal carbonates which may be employed include, but are not limited to, sodium carbonate ($Na_2CO_3$).

In another embodiment, the at least one alkali material is an alkali metal bicarbonate. Alkali metal bicarbonates which may be employed include, but are not limited to, sodium bicarbonate ($NaHCO_3$), and potassium bicarbonate ($KHCO_3$).

In another embodiment, the at least one alkali material is an alkaline earth metal carbonate. Alkaline earth metal carbonates which may be employed include, but are not limited to, calcium carbonate ($CaCO_3$).

In another embodiment, the at least one alkali material is an alkali metal silicate. Alkali metal silicates which may be employed include, but are not limited to, sodium metasilicate ($Na_2SiO_3$).

In another embodiment, the at least one alkali material is present in an amount of from about 3 wt. % to about 35 wt. %, preferably from about 5 wt. % to about 10 wt. %, with the remainder being magnesium silicate, based on the two components.

The magnesium silicate and the at least one alkali material employed in accordance with the present invention can be used to treat used cooking oil and/or fats in conjunction with any operation for filtering used cooking oil and fats.

The method of the present invention is applicable to continuous filtration systems in which used cooking oil is circulated continuously through filtration units and back to the frying vats and/or vat systems wherein one or more times a day, the contents of each frying vat are filtered through a batch type filter. The magnesium silicate and the at least one alkali material employed in accordance with the present invention may be employed both as a precoat and a body feed in either a continuous or batch filtration system.

In a conventional cooking apparatus, or in an industrial frying application, in general, at least 0.005 lb. of the composition, and preferably at least 0.01 lb. of the composition, is employed per pound of used cooking oil. In general, the amount of composition employed does not exceed 0.02 lb. per pound of used cooking oil.

The selection of an optimum amount will depend on but not be limited to the frequency of treatment and the condition of the oil. The magnesium silicate and the at least one alkali material are used in an amount effective to reduce FFA or color or other contaminant levels so as to extend the period of use of the oil. The maximum amount will be determined by required oil quality, economics, and filtration flow properties in the operation. In general, the treatment is effected in a manner such that the cooking oil or fat is not cooled to a temperature below 212° F.

In one embodiment, after treatment with the magnesium silicate and the at least one alkali material, the treated oil may be combined with a conventional filter aid for subsequent filtration. It is to be understood, however, that in most cases the magnesium silicate and the at least one alkali material may be employed to treat the used cooking oil and, after such treatment, the oil is filtered without the addition of a conventional filter aid.

The magnesium silicate and the at least one alkali material employed in accordance with the present invention are capable of maintaining contaminant levels below the point of discard for an extended period of time. This is accomplished without producing other adverse effects in the oil, such as excessive discoloration or excessive foaming.

The present invention also is applicable to industrial frying operations, which are conducted as hereinabove described.

Applicants have found that, by contacting used cooking oil, in conventional restaurant-type filtration and frying systems or in industrial frying systems, with a combination of magnesium silicate and the at least one alkali material, one obtains an improved extension of the useful life of the cooking oil without affecting food quality adversely. Such treatment reduces the free fatty acid content of the oil without causing excessive discoloration or foaming. Food quality actually has been reported to improve with use.

The invention now will be described with respect to the drawings, wherein.

Figure 1:
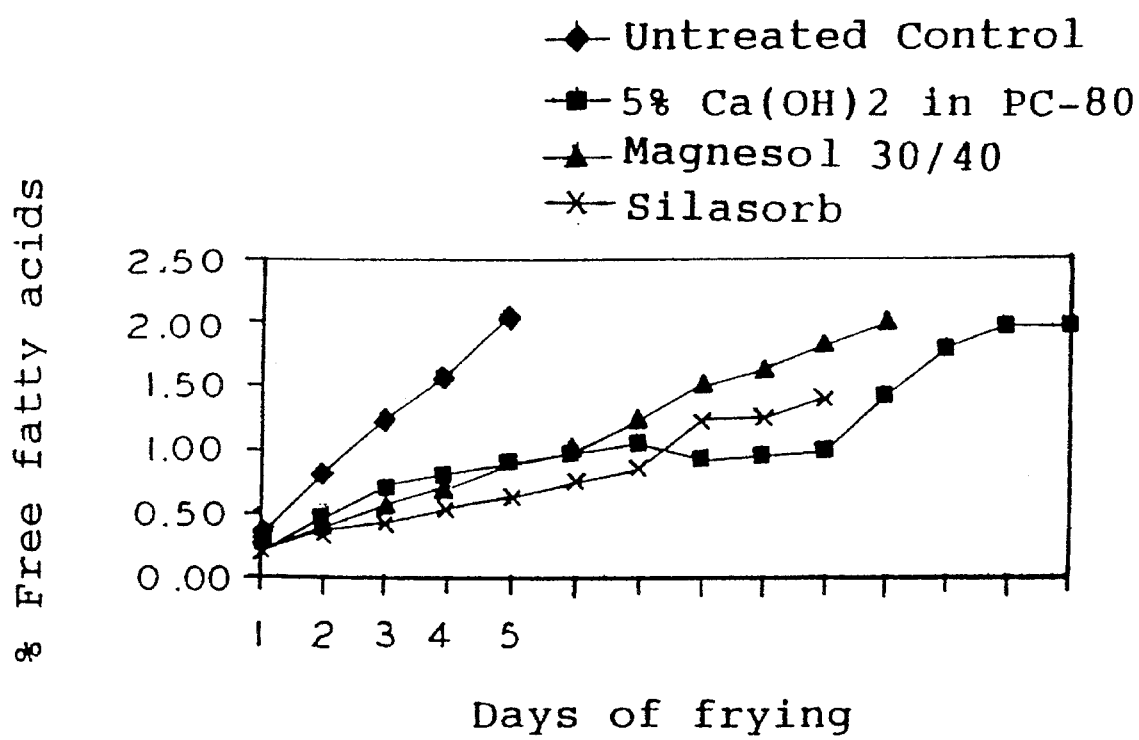
FIG. 1 is a graph of the free fatty acid content over time of (i) an untreated cooking oil; (ii) a cooking oil treated with magnesium silicate and calcium hydroxide; (iii) a cooking oil treated with magnesium silicate; and (iv) a cooking oil treated with calcium silicate.

The invention now will be described with respect to the following examples; however, the scope of the present invention is not intended to be limited thereby.

In the following examples, initial and treated oils were analyzed by the official American Oil Chemists' Society methods for percent free fatty acids (Ca 5a-40), photometric color (Cc 13c-50), and titratable soap value (Cc 17-79) to determine such values and the changes in such values as a result of the treatments described below.

EXAMPLE 1

In one set of experiments, a used cooking oil having a free fatty acid (FFA) content of 1.10% was treated at 150° C. for 1 hour with the following blends of Magnesol® XL and alkali materials:

1. 65 wt. % Magnesol®XL and 35 wt. % MgO
2. 65 wt. % Magnesol®XL and 35 wt. % $Na_2CO_3$
3. 65 wt. % Magnesol and 35 wt. % $NaHCO_3$.

The above blends are referred to as Blend 1, Blend 2, and Blend 3.

The Magnesol®XL was present in an amount of 1 wt. % based on the weight of the oil. The MgO, $Na_2CO_3$, or $NaHCO_3$ was present in an amount of 0.60 g.

In another set of experiments, the oil was contacted at 150° C. for 1 hour with 2 wt. %, based on the weight of the oil, of the following treatment blends; also referred to as Blends 4 through 15:

4. Silasorb alone.
5. 95 wt. % Magnesol®XL and 5 wt. % $NaHCO_3$.
6. 95 wt. % Magnesol®XL and 5 wt. % $NaHCO_3$.
7. 90 wt. % Magnesol®XL and 10 wt. % $NaHCO_3$.
8. 85 wt. % Magnesol®XL and 15 wt. % $NaHCO_3$.
9. 85 wt. % Magnesol®XL and 15 wt. % $NaHCO_3$.
10. 75 wt. % Magnesol®XL and 25 wt. % $NaHCO_3$.
11. 65 wt. % Magnesol®XL and 35 wt. % $NaHCO_3$.
12. 95 wt. % Magnesol®XL and 5 wt. % $KHCO_3$.
13. 90 wt. % Magnesol®XL and 10 wt. % $KHCO_3$.
14. 85 wt. % Magnesol®XL and 15 wt. % $KHCO_3$.
15. 75 wt. % Magnesol®XL and 25 wt. % $KHCO_3$.

Silasorb is a calcium silicate which has the following typical chemical analysis:

$SiO_2$—46.68 wt. %
CaO—28.12 wt. %
$Al_2O_3$—2.0 wt. %
$Fe_2O_3$—1.0 wt. %
MgO—0.6 wt. %
$Na_2O+K_2O$=1.4 wt. %
Total loss on ignition—15.0 wt. %

The changes in the % FFA and soap value are reported as the actual change in the value. The change in color is reported as a percent of the initial value. A negative sign indicates that the value increased. The results are given in Table I below.

TABLE I

| Blend | % FFA | FFA change | Color % change | Soap value change (ppm) |
|---|---|---|---|---|
| Initial oil | 1.10 | — | — | — |
| 1 | 0.95 | 0.15 | 14.3 | −8 |
| 2 | 0.93 | 0.17 | 14.3 | −50 |
| 3 | 0.20 | 0.90 | −2.3 | −645 |
| 4 | 0.74 | 0.36 | −10.5 | −510 |
| 5 | 0.79 | 0.31 | 21.3 | −145 |
| 6 | 0.77 | 0.33 | 8.3 | −326 |
| 7 | 0.69 | 0.41 | 2.5 | −1750 |
| 8 | 0.43 | 0.67 | 2.3 | −401 |
| 9 | 0.37 | 0.73 | −18.9 | −830 |
| 10 | 0.15 | 0.95 | −5.1 | −285 |
| 11 | 0.20 | 0.90 | −2.3 | −645 |
| 12 | 0.84 | 0.26 | 5.9 | −123 |
| 13 | 0.79 | 0.31 | 4.1 | −324 |
| 14 | 0.77 | 0.33 | −0.7 | −577 |
| 15 | 0.44 | 0.66 | −146 | −2680 |

EXAMPLE 2

In one set of experiments, a cooking oil having an initial FFA content of 1.15% was treated at 150° C. for 1 hour with 2 wt. %, based on the weight of the oil, of Silasorb alone (Blend 4), or one of the following absorbents, hereinafter referred to as Blend 16 and Blend 17:

16. 90 wt. % Magnesol®PC-80 and 10 wt. % CaO.
17. 90 wt. % Magnesol®PC-80 and 10 wt. % Ca(OH)$_2$.

In another experiment, a used cooking oil having a free fatty acid content of 1.04 wt. % was treated as hereinabove described with 2 wt. % Silasorb alone (Blend 4), or one of the following absorbents, hereinafter referred to as Blends 18 through 21:

18. 95 wt. % Magnesol®PC-80 and 5 wt. % Ca(OH)$_2$.
19. 93 wt. % Magnesol®PC-80 and 7 wt. % Ca(OH) 2.
20. 90 wt. % Magnesol®PC-80 and 10 wt. % Ca(OH)$_2$.
21. 90 wt. % Magnesol®PC-80 and 10 wt. % CaO.

Free fatty acid values, changes in free fatty acid content, color changes, and soap value changes were determined as hereinabove described. The results are given in Table II below.

TABLE II

| Blend | FFA | FFA change | Color % change | Soap value change (ppm) |
|---|---|---|---|---|
| Initial oil | 1.15 | — | — | — |
| 4 | 0.78 | 0.37 | −10.6 | −316 |
| 16 | 0.83 | 0.32 | 8.5 | −82 |
| 17 | 0.68 | 0.47 | 13.9 | −167 |
| Initial oil | 1.04 | — | — | — |
| 4 | 0.83 | 0.21 | 0 | −150 |
| 18 | 0.80 | 0.24 | 19.9 | −65 |
| 19 | 0.70 | 0.34 | 11.4 | −416 |
| 20 | 0.69 | 0.35 | 21.3 | −78 |
| 21 | 0.81 | 0.23 | 16.1 | −92 |

The above results show that calcium hydroxide has a more positive effect than calcium oxide in lowering the FFA concentration, and in improving the color of the oil.

EXAMPLE 3

In this example, four sets of 40 lbs. of chicken were fried per day in partially hydrogenated soybean oil in a 10 lb. capacity fryer. The oils were treated daily for one hour with 2 wt. %, based on the weight of the oil, of (i) Magnesol®30/40; (ii) 95 wt. % Magnesol®PC-80 and 5 wt. % Ca(OH)$_2$; or (iii) Silasorb. A fourth oil (Control) was not treated. The oils were treated before filtration. The tests for the control oil, the oil treated with Magnesol®30/40, and the oil treated with 95 wt. % Magnesol®PC-80 and 5 wt. % Ca(OH)$_2$ were ended when the FFA content of the oil was over 2% by weight. The test of the oil treated with Silasorb ended when the oil began to foam uncontrollably. The untreated control oil was used for 5 days. The oil treated with Magnesol®PC-80 and Ca(OH)$_2$ was used for 14 days. The oil treated with Magnesol®30/40 was used for 11 days. The oil treated with Silasorb was used for 10 days.

Figure 2:
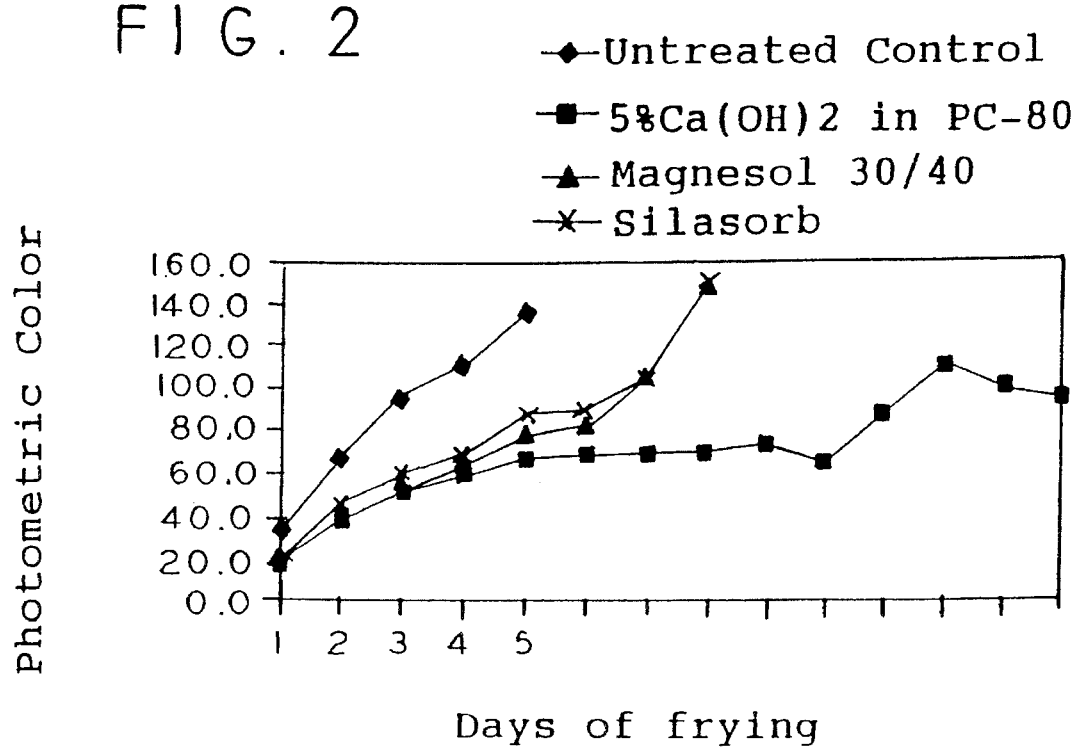
FIG. 2 is a graph of the photometric color over time of the cooking oils described in FIG. 1.
Figure 3:
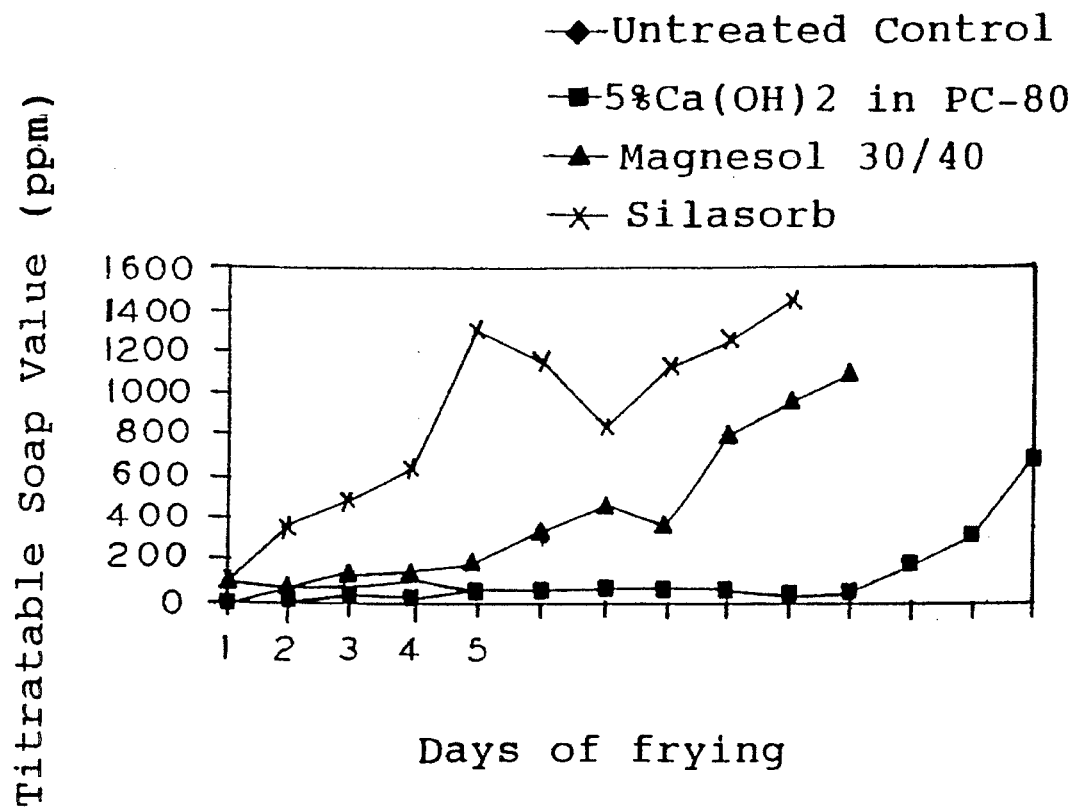
FIG. 3 is a graph of the titratable soap value (ppm) over time of the cooking oils described in FIG. 1.

The oils were tested for % FFA content, photometric color, and titratable soap value (ppm). The % FFA content results are shown in FIG. 1; the photometric color results are shown in FIG. 2; and the titratable soap values are shown in FIG. 3.

The results indicate that the blend of 95 wt. % Magnesol®PC-80 and 5 wt. % Ca(OH)$_2$ was superior to the other systems tested in all aspects of oil quality: days of frying, % FFA content, photometric color, and titratable soap value.

The present invention is particularly advantageous in that the useful life of cooking oil and/or fat (shortening), which has been used for the high temperature frying of foods, can be extended, thereby reducing the overall cost. The use of magnesium silicate and the at least one alkali material in accordance with the present invention maintains FFA levels below the disposal threshold, and filtration may be accomplished at high flow rates and with low pressure drops, whereby the magnesium silicate and the at least one alkali material may be employed in combination with commercial shortening filters, as well as industrial frying systems.

The above advantages, and other advantages, should be apparent to those skilled in the art from the teachings herein.

The disclosure of all patents, publications, including published patent applications, and database entries referenced in this specification are specifically incorporated by reference in their entirety to the same extent as if each such individual patent, publication and database entry were specifically and individually indicated to be incorporated by reference.

Numerous modifications and variations of the present invention are possible in light of the above teachings and, therefore, within the scope of the appended claims, the invention may be practiced otherwise than as particularly described.

What is claimed is:

1. A process for treating cooking oil or fat, comprising:
   contacting cooking oil or fat with (a) magnesium silicate and (b) at least one alkali material selected from the group consisting of alkaline earth metal hydroxides; alkaline earth metal oxides; alkali metal carbonates; alkali metal bicarbonates; alkaline earth metal carbonates; and alkali metal silicates, said magnesium silicate and said at least one alkali material being present in amounts effective to reduce the content of free fatty acids in the oil or fat and extend the usable life of the oil or fat for cooking.

2. The process of claim 1 wherein the ratio of magnesium silicate to alkali material is at least 1.8:1 and no greater than 32:1, all by weight.

3. The process of claim 1 wherein the ratio of magnesium silicate to alkali material is at least 9:1 and no greater than 19:1, all by weight.

4. The process of claim 1 wherein said magnesium silicate has a surface area of at least 300 square meters per gram.

5. The process of claim 4 wherein said magnesium silicate has a surface area of at least 400 to about 700 square meters per gram.

6. The process of claim 4 wherein said magnesium silicate has a particle size such that at least 75% of the particles have a size greater than 400 mesh and no more than 15% have a particle size greater than 40 mesh.

7. The process of claim 4 wherein said magnesium silicate has a particle size of from about 20 microns to about 75 microns.

8. The process of claim 4 wherein said magnesium silicate has a bulk density of from about 25 to about 32 pounds per cubic foot.

9. The process of claim 1 wherein said magnesium silicate is an amorphous hydrous precipitated synthetic magnesium silicate, said magnesium silicate having been treated to reduce the pH thereof to less than about 9.0.

10. The method of claim 9 wherein said magnesium silicate has a pH in a 5% slurry of from about 8.2 to about 8.9.

11. The method of claim 10 wherein said magnesium silicate has a pH in a 5% slurry of from about 8.5 to about 8.8.

12. The method of claim 1 wherein said magnesium silicate has a surface area of from about 50 square meters per gram to about 150 square meters per gram.

13. The method of claim 12 wherein said magnesium silicate has a mole ratio of MgO to $SiO_2$ of from about 1:2.6 to about 1:3.4 and a pH in a 5% water suspension of from about 9.5 to about 10.5.

14. The method of claim 1 wherein said at least one alkali material is an alkaline earth metal hydroxide.

15. The method of claim 14 wherein said alkaline earth metal hydroxide is calcium hydroxide.

* * * * *